United States Patent
Abrams et al.

(10) Patent No.: US 9,678,600 B2
(45) Date of Patent: Jun. 13, 2017

(54) DISPLAY DEVICE INCLUDING A DISPLAY SCREEN WITH INTEGRATED IMAGING AND A METHOD OF USING SAME

(71) Applicant: International Business Machines Corporation, Armonk, NY (US)

(72) Inventors: Carl E. Abrams, Briarcliff Manor, NY (US); Jonathan H. Connell, II, Cortlandt-Manor, NY (US); Nalini K. Ratha, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 85 days.

(21) Appl. No.: 14/245,442

(22) Filed: Apr. 4, 2014

(65) Prior Publication Data

US 2015/0286306 A1 Oct. 8, 2015

(51) Int. Cl.
*G06F 3/042* (2006.01)
*G09G 5/00* (2006.01)
*G06K 9/00* (2006.01)
*G09G 3/32* (2016.01)

(52) U.S. Cl.
CPC ............ *G06F 3/042* (2013.01); *G06K 9/0004* (2013.01); *G09G 5/003* (2013.01); *G09G 3/32* (2013.01); *G09G 2300/0404* (2013.01); *G09G 2360/144* (2013.01); *G09G 2360/147* (2013.01)

(58) Field of Classification Search
CPC ........ G06F 3/042; G06F 3/041; G06F 3/0412; G09G 5/003; G09G 2300/0404; G09G 2360/147; G09G 2360/144; G09G 3/32; G06K 9/0004
See application file for complete search history.

(56) References Cited

U.S. PATENT DOCUMENTS

| | | | | |
|---|---|---|---|---|
| 4,490,618 A | * | 12/1984 | Cielo | G01B 11/303 250/559.01 |
| 6,327,376 B1 | * | 12/2001 | Harkin | G01B 7/004 382/124 |
| 7,539,330 B2 | | 5/2009 | Rowe | |
| 7,831,072 B2 | | 11/2010 | Rowe | |
| 8,175,346 B2 | | 5/2012 | Rowe et al. | |
| 8,830,208 B2 | * | 9/2014 | Sohn | G06F 3/0421 345/173 |
| 9,213,438 B2 | * | 12/2015 | Su | G06F 3/042 |
| 2004/0252867 A1 | * | 12/2004 | Lan | G06K 9/0004 382/124 |

(Continued)

FOREIGN PATENT DOCUMENTS

| CN | 101419662 A | 4/2009 |
|---|---|---|
| CN | 201498007 U | 6/2010 |

(Continued)

*Primary Examiner* — Nalini Mummalaneni
*Assistant Examiner* — Ivelisse Martinez Quiles
(74) *Attorney, Agent, or Firm* — Alexa L. Ashworth; Ryan, Mason & Lewis, LLP

(57) ABSTRACT

A display device comprises a plurality of light emitting elements in a layer on a substrate, a plurality of microprisms positioned over the layer, a plurality of light detectors on the substrate, each light detector respectively corresponding to a light emitting element of the plurality of light emitting elements, and a display screen, wherein the light detectors are used to sense at least one property of an item in contact with the display screen.

20 Claims, 5 Drawing Sheets

(56) References Cited

U.S. PATENT DOCUMENTS

| | | |
|---|---|---|
| 2006/0115128 A1 | 6/2006 | Mainguet |
| 2009/0074255 A1* | 3/2009 | Holm .................. G06K 9/0004 382/115 |
| 2009/0080709 A1* | 3/2009 | Rowe ................ G06K 9/00013 382/115 |
| 2010/0183200 A1 | 7/2010 | Wu |
| 2010/0208953 A1 | 8/2010 | Gardner et al. |
| 2010/0271334 A1* | 10/2010 | Yuan .................... G06F 3/0428 345/175 |
| 2010/0321152 A1* | 12/2010 | Argudyaev ........ G06K 9/00053 340/5.53 |
| 2011/0221707 A1* | 9/2011 | Oyobe ................ G02F 1/13338 345/175 |
| 2012/0133618 A1* | 5/2012 | Usukura ............. G02F 1/13338 345/175 |
| 2012/0182253 A1 | 7/2012 | Brosnan |
| 2012/0242635 A1* | 9/2012 | Erhart ..................... G06F 3/041 345/207 |
| 2012/0287085 A1* | 11/2012 | Yuki ..................... G06F 3/0412 345/175 |
| 2012/0306815 A1* | 12/2012 | Su ........................... G06F 3/042 345/175 |
| 2013/0076485 A1* | 3/2013 | Mullins .............. G06K 9/00087 340/5.83 |
| 2013/0287272 A1* | 10/2013 | Lu ........................... G06F 3/041 345/173 |
| 2014/0129843 A1* | 5/2014 | Shi ......................... G06F 21/32 713/182 |
| 2014/0218327 A1* | 8/2014 | Shi ......................... G06F 3/041 345/174 |
| 2015/0070323 A1* | 3/2015 | Hong .................... G06F 3/0416 345/175 |

FOREIGN PATENT DOCUMENTS

| | | |
|---|---|---|
| EP | 1475740 A2 | 11/2004 |
| KR | 10-0611135 B1 | 8/2006 |
| KR | 10-2011-0054089 A | 5/2011 |
| KR | 10-2012-0083246 A | 7/2012 |

\* cited by examiner

FIG. 2
(a)
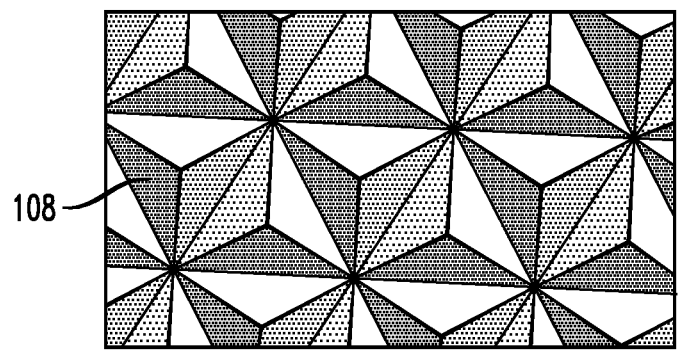
(b)
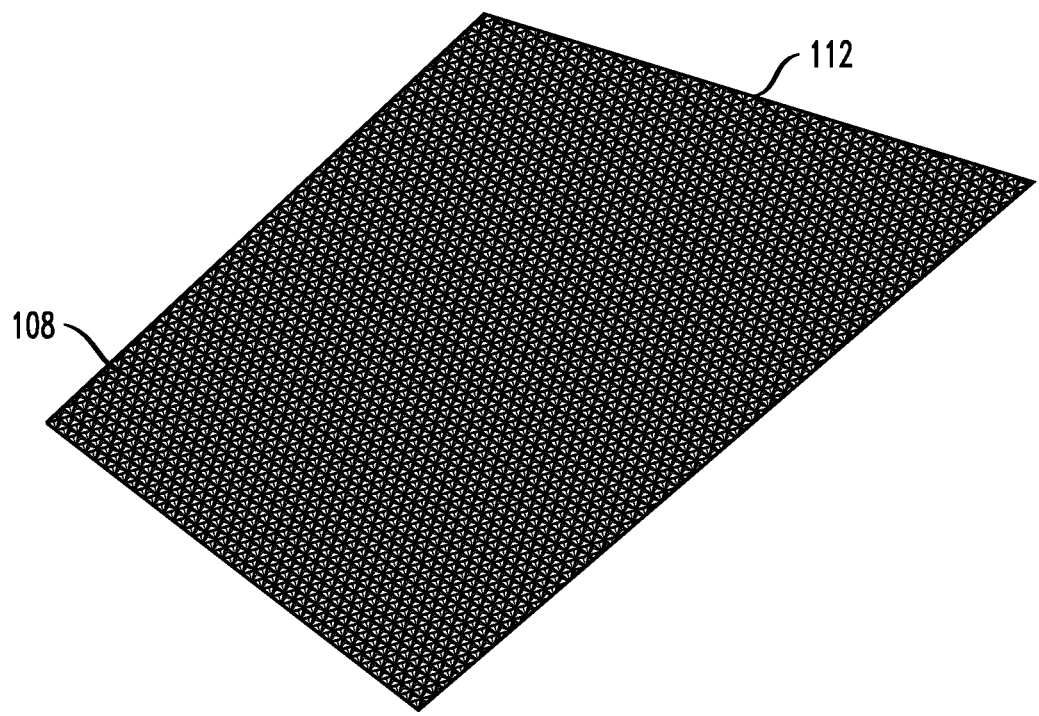

DISPLAY DEVICE INCLUDING A DISPLAY SCREEN WITH INTEGRATED IMAGING AND A METHOD OF USING SAME

TECHNICAL FIELD

The field generally relates to display devices and methods of using same and, in particular, to a display device including a display screen with integrated imaging, and a method of using same.

BACKGROUND

Current touch screens found in display devices, such as display devices for portable electronic devices like smartphones and tablets, have limitations on the functions that they can perform. For example, current touch screens react to finger touches only, and while capable of displaying images, are not able to sense high resolution objects, such as fingerprints or palm prints, and are not able to read documents or other image-like inputs. As a result, current touch screens are not able to provide adequate biometric support functions or scanning functions. Also, the current touch screens found in display devices can seldom be read in both bright and dim areas.

Known screens for devices such as laptops and mobile devices display information using liquid crystal display (LCD) modulation of ambient light or a backlight, or by light emitting diode (LED) emission at desired areas (e.g., pixels). To sense touch, known screens typically include a sensing layer, such as a capacitive or resistive touch sensor. Other less common techniques for sensing touch include surface acoustic waves or arrays of photo-beams. Known techniques for sensing touch add complexity to a device in terms of manufacture as well as in terms of registration (e.g., corresponding a touch location with a display location).

In addition, known screens using touch sensors typically do not have enough resolution to sense biometric parameters. For instance, a multi-touch screen cannot determine the shape of the user's hand when applied to the screen (e.g., finger lengths and knuckle widths). In general, current touch sensors cannot perform imaging, such as would be needed to extract a fingerprint for biometric authentication. Such biometrics provide an added layer of security and non-repudiability that can be convenient, and a desirable property for a device.

Accordingly, there is a need for a display device and method of using same that includes a display screen that is capable of functioning as a touch screen and providing biometric support and scanning functions.

SUMMARY

In general, exemplary embodiments of the invention include display devices and methods of using same and, in particular, a display device including a display screen with integrated imaging, and a method of using same.

According to an exemplary embodiment of the present invention, a display device comprises a plurality of light emitting elements in a layer on a substrate, a plurality of microprisms positioned over the layer, a plurality of light detectors on the substrate, each light detector respectively corresponding to a light emitting element of the plurality of light emitting elements, and a display screen, wherein the light detectors are used to sense at least one property of an item in contact with the display screen.

According to an exemplary embodiment of the present invention, a method for using a display device including a display screen, comprises emitting light from a plurality of light emitting elements in a layer on a substrate to a plurality of microprisms positioned over the layer, transmitting the light through the plurality of microprisms, reflecting at least some of the light to a plurality of light detectors on the substrate, sensing at least part of an image of an item in contact with the display screen at some of the plurality of light detectors, and aggregating a response from the at least some of the plurality of light detectors to form the image of the item in contact with the display screen.

These and other exemplary embodiments of the invention will be described or become apparent from the following detailed description of exemplary embodiments, which is to be read in connection with the accompanying drawings.

BRIEF DESCRIPTION OF THE DRAWINGS

Exemplary embodiments of the present invention will be described below in more detail, with reference to the accompanying drawings, of which:

FIG. 2(a) is a view showing a configuration of microprisms, in accordance with an embodiment of the present invention.

FIG. 2(b) illustrates a sheet of microprisms, in accordance with an embodiment of the present invention.

DETAILED DESCRIPTION OF EXEMPLARY EMBODIMENTS

Figure 1:
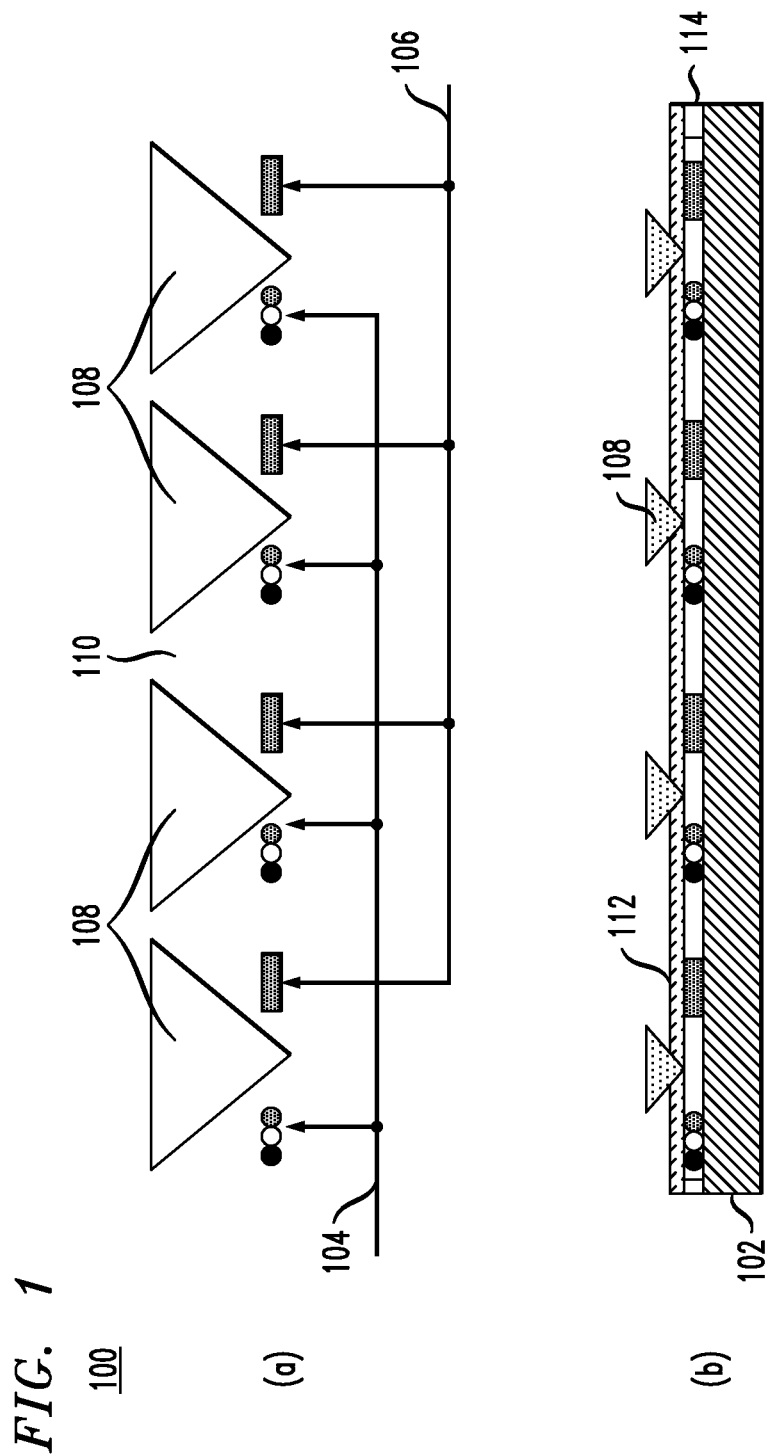
FIGS. 1(a) and 1(b) are high-level cross-sectional diagrams of a display device, according to an embodiment of the present invention.

Exemplary embodiments of the invention will now be discussed in further detail with regard to display devices and methods of using same and, in particular, to a display device including a display screen with integrated imaging, and a method of using same. This invention may, however, be embodied in many different forms and should not be construed as limited to the embodiments set forth herein.

The embodiments of the present invention include a display device which is capable of displaying an image, and includes a plurality of microprisms, light sources (also referred to herein as light emitters) and light detectors (e.g., photo sensors). The microprisms operate under a frustrated total internal reflectance (FTIR) model, such that only items in contact with a touch screen will dim a throughput of photons. This provides touch sensing which is intrinsically registered to light emitters of the display.

As used herein, "frustrated total internal reflectance" or "FTIR" can refer to a scenario when a user or object comes into contact with a surface of a display screen, light rays from a light source/emitter are frustrated, since they can now pass through into a contact material (e.g., a skin layer on top of the surface of the display screen), and the reflection is no longer total at that point. The frustrated light is scattered towards a light detector capable of picking these objects up, and relaying their images to tracking software. Therefore, the light that is frustrated by a user exits a material in a defined area under the contact point and becomes clearly visible to a corresponding light detector.

In accordance with an embodiment of the present invention, a relatively large number of microprisms allows a correspondingly large number of sensing locations, thus providing imaging capabilities. In addition, according to an embodiment, light emitters and detectors can be fabricated on the same layer, and a microprism sheet including a plurality of microprisms can be disposed on top of the layer of light emitters and detectors, resulting in a unitary construction.

It is to be understood that the various layers and/or regions shown in the accompanying drawings are not drawn to scale, and that one or more layers and/or regions of a type commonly used in display devices may not be explicitly shown in a given drawing. This does not imply that the layers and/or regions not explicitly shown are omitted from the actual display devices. Moreover, the same or similar reference numbers used throughout the drawings are used to denote the same or similar features, elements, or structures, and thus, a detailed explanation of the same or similar features, elements, or structures will not be repeated for each of the drawings.

The display devices and methods for using same in accordance with the embodiments of the present invention can be employed in applications, hardware, and/or electronic systems. Suitable hardware and systems for implementing embodiments of the invention may include, but are not limited to, personal computers, communication networks, electronic commerce systems, portable communications devices (e.g., cell and smart phones), solid-state media storage devices, functional circuitry, etc. Systems and hardware incorporating the display devices are contemplated embodiments of the invention. Given the teachings of the embodiments of the invention provided herein, one of ordinary skill in the art will be able to contemplate other implementations and applications of embodiments of the invention.

Referring to FIGS. 1(a) and 1(b), which are high-level cross-sectional diagrams of a display device according to an embodiment of the present invention, the display device 100 includes a substrate 102, and a plurality of light emitters 104, which are used to form a display image, formed on the substrate 102. The substrate 102 may comprise, for example, a semiconductor material including, but not limited to, Si, SiGe, SiC, SiGeC or other like semiconductor. In addition, multiple layers of the semiconductor materials can be used as the material of the substrate 102.

The light emitters 104 can be, for example, light emitting diodes (LEDs). The display device 100 further includes a plurality of light detectors 106, such as, for example, photo detectors/sensors and/or cameras, formed on the substrate 102. Photo detectors can be, for example, silicon photo detectors. In accordance with an embodiment, the light detectors and emitters 104, 106 are formed on a same layer on the substrate and are spaced apart from each other. In another embodiment, the light emitters 104 and detectors 106 can be formed on different layers of the substrate.

The display device further includes a plurality of microprisms 108 formed over the layer including the light emitters 104 and the light detectors 106. In accordance with an embodiment of the present invention, the microprisms 108 are positioned at a relatively fine pitch with respect each other. For example, according to an embodiment, the display device can include about 100-about 500 microprisms per inch and a corresponding light emitter 104 and light detector 106 for each microprism or for a predetermined number of microprisms. In accordance with an embodiment, there can be at least one microprism for each pixel of a display device. According to an embodiment, a microprism, light emitter and light detector combination may respectively correspond each pixel of a display device so that there is a microprism 108, a light emitter 104 and a light detector 106 for each pixel. The number of microprisms per unit length may be adjusted to match a quality required to detect an image, such as, for example a fingerprint or palm print image. In accordance with an embodiment, the light emitters 104 and detectors 106 can be formed in an array, such as a matrix array. In accordance with an embodiment of the present invention, a geometric arrangement of a light emitting element 104, a microprism 108 and a light detector 106 are such that total internal reflection occurs within the microprism 108.

Referring to FIG. 2(a), which is a view showing a configuration of microprisms 108, in accordance with an embodiment of the present invention, and to FIG. 2(b), which illustrates a sheet 112 of microprisms 108, in accordance with an embodiment of the present invention, the microprisms 108 are positioned adjacent each other on a sheet 112. Referring also to FIG. 1(b), in accordance with an embodiment of the present invention, the sheet 112 is bonded to the layer including the light emitters and light detectors 104, 106 via a bonding agent 114, such as, for example, an adhesive. Alternatively, the sheet 112 can be an integrated structure with the layer including the light emitters and light detectors 104, 106. In accordance with an embodiment, the microprisms 108 are on a same layer as each other. Alternatively, the microprisms 108 can be positioned on different layers from each other. The arrangement of the microprisms 108 on the sheet 112 is not necessarily limited to what is shown in FIGS. 2(a) and 2(b) and may vary. In particular, the microprisms may be aggregated into extended linear stripes. In accordance with an embodiment of the present invention, the microprisms have a dielectric constant substantially different from that of air and largely similar to or the same as that of human skin. In addition, according to an embodiment, if the microprisms are covered with a plate or screen, this plate has a similar or the same dielectric constant to that of the microprisms. In addition, in accordance with an embodiment of the present invention, the angles of the interior faces of the microprisms are such that the light from the light emitting elements can enter these faces without any substantial reduction in strength. Similarly, the angle is such that the light is able to exit the opposite face to impinge on the light detectors without substantial hindrance.

Figure 3:
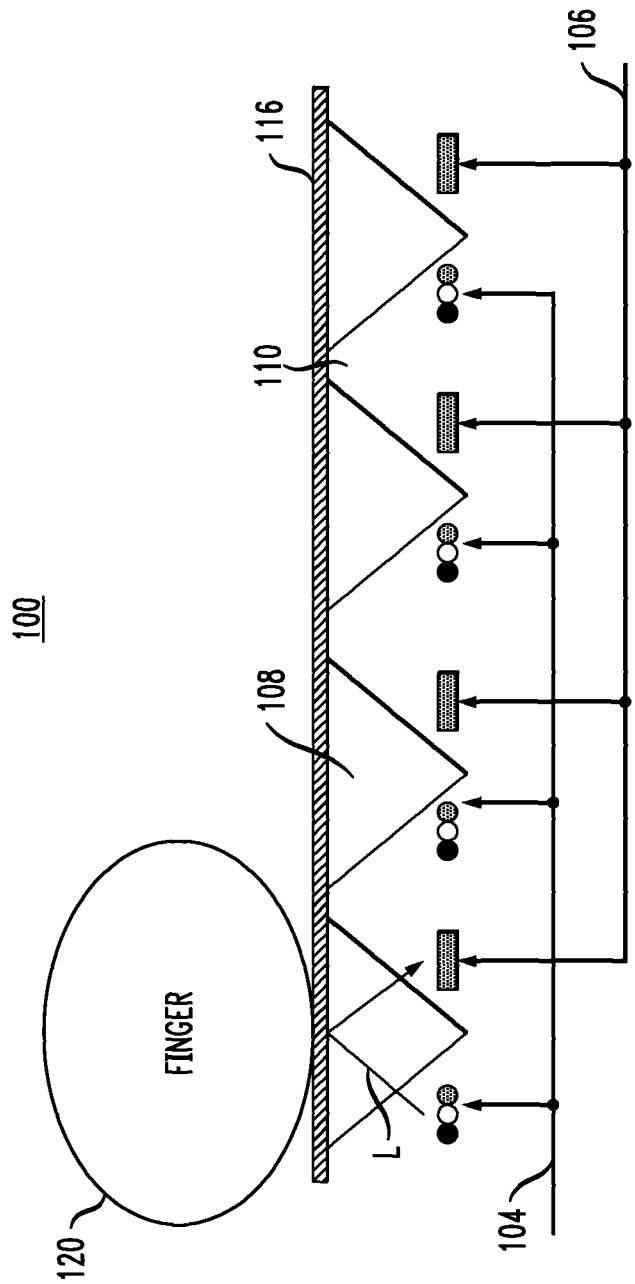
FIG. 3 is a diagram illustrating operation of a display device, in accordance with an embodiment of the present invention.

In accordance with an embodiment of the present invention, the photo detectors 106 function as single pixel cameras (similar to a fly's compound eye, including multiple sensors sensing reflectivity or illumination in a particular localized area). As can be seen from FIG. 3, which is a diagram illustrating operation of a display device, in accordance with an embodiment of the present invention, when a particular light emitter 104 (e.g., LED) is turned on, some of its light L bounces through the prism 108 and is picked up by the adjacent photo detector 106. In normal operation, each photo detector 106 senses bright light, except when something (e.g., finger 120) is in contact with a region of a display screen 116 corresponding to its associated prism 108, in which case the photo detector 106 senses a dark image. Under the principle of FTIR described above, when light impinges on the inside of the top surface of a prism 108 at an incident angle beyond a critical angle, the majority of the photons are reflected back and can be gathered by a light sensor on the far side. The critical angle depends on the difference in dielectric constants across a top surface interface. A material such as skin has a dielectric constant that is closer to that of the material of the screen 116 than air is. Therefore, some of the photons will leak across the surface into a contact material (e.g., a skin layer on top of the surface of the display screen), and the reflection is no longer total at that point. This leads to noticeable dark areas in the image where the skin is in contact with an area corresponding to the prism. According to an embodiment of the present invention, the location of a finger contact is determined and the friction ridges of the skin of a subject are detected using the principle of FTIR.

In accordance with an embodiment, the responses from the plurality of detectors 106 are aggregated to form an image of the object in contact with the display device including the prism sheet 112. The object can be, for example, a palm print, fingerprint, a document including images and/or text, etc. In accordance with an embodiment of the present invention, the corresponding photo detectors 106 are directly registered to the respective corresponding display LEDs 104. The aggregation can be performed by, for example, an aggregation module connected to the plurality of detectors 106 and running, for example, aggregation software, to process the responses from the plurality of detectors 106. The captured image coupled with a position of the image activate one or more functions, such as, for example, biometric authentication of an object in contact with a screen of the display device. In accordance with an embodiment of the present invention, the captured image comprises a plurality of sub-images, each sub-image having an associated location in the captured image. The associated locations of the sub-images may specify respective finger contacts. The sub-images can be associated with plurality of objects in contact with a screen of the display device, wherein biometric authentication is performed on the plurality of objects.

In accordance with an embodiment of the present invention, while the pitches of the prisms and sensors can be designed to allow fingerprint imaging, the same device 100 has other uses. For example, the device 100 can determine where a finger 120 or fingers (in the case of a multi-touch) are in contact with a display screen 116 since these generate large dark areas. The device 100 can also be used to image at a relatively coarser scale, such as to give an overall shape and geometry of a full hand in contact with the screen 116, which can be another useful biometric.

Some materials, such as paper, may not image well with frustrated total internal reflectance. However, given the repetitive microprism, light emitter and light detector structure of the device 100, there are light detectors 106 (e.g., photo detectors) and microprisms 108 adjacent to each of the light emitters 104 (e.g., LEDs). In accordance with an embodiment, without loss of functionality, a small gap 110 can be placed between neighboring microprisms 108. The gap 110 can be, for example, a flat section with no active optical properties. Due to the presence of the gap 110, when the light emitters 104 adjacent to a light detector 106 are activated, their light can be transmitted up through this gap 110. If a diffuse reflective surface, such as paper, covers this gap, then some of the emitted photons will be sensed. However, if there is a dark mark on the paper at the gap location (e.g., text), then fewer photons will be reflected directly back. In this way, the device 100 can be used as a contact imager for documents. A light detector 106 senses diffused reflectance of an object covering the gap 110. It is to be understood that embodiments of the present invention are also contemplated where the gap 110 between microprisms 108 is omitted.

In accordance with an embodiment of the present invention, the light detectors 106 (e.g., photo detectors) can be used to sense ambient lighting in an environment. In accordance with an embodiment of the present invention, the light emitters 104 (e.g., LEDs) are temporarily turned off, and once the lighting conditions have been determined, a proper level of illumination can be determined for all the LEDs (e.g., bright if in sunlight, and dim if in a dark room). The gap 110 between microprisms can also function to permit the ambient light to reach the light detectors 106 so that the ambient illumination at a display screen can be sensed.

Accordingly, embodiments of the present invention provide a device that, in addition to functioning as a display device to display, for example, images, video, and text, can function: as a biometric sensor to sense, for example, fingerprints (e.g., fingerprint ridge images) and palm prints, as a document scanner (e.g., make contact prints of documents), as a touch screen that can sense any object or multiple objects (e.g., multiple touch points) touching the screen, and as a display that can adjust to external lighting (e.g., bright light, dim light or no light).

In accordance with an embodiment of the present invention, the display device can be structured to perform different tasks at predetermined regions of the display screen. For example, in an illustrative embodiment, a quadrant of a display screen can be designed to function as a biometric sensor and/or document scanner, while other quadrants respectively function as a touch screen sensing single or multiple objects, and to sense ambient light. Therefore, the underlying structure of the display device, including, for example, a configuration and number of microprisms, light emitters and light detectors, in each quadrant or region can vary according to the function at that region. In another embodiment, any given region or an entire area of a display screen can be capable of performing more than one or each of the different tasks.

Figure 4:
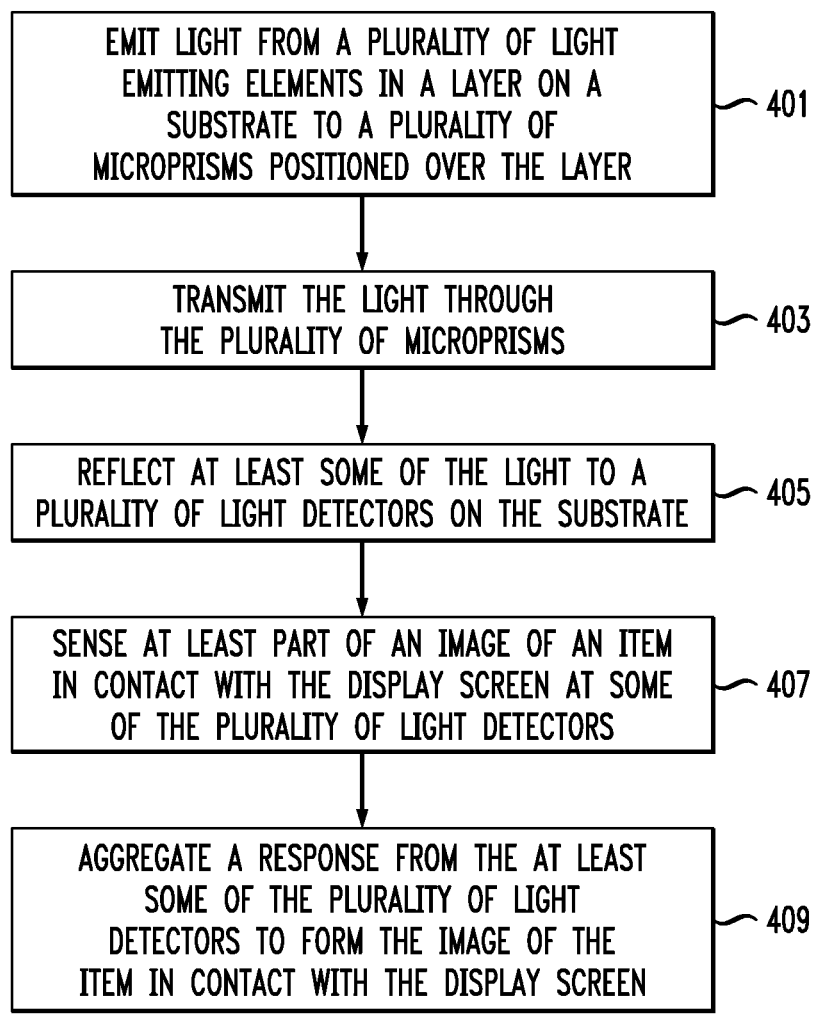
FIG. 4 is a flow diagram of a method for using a display device including a display screen capable of displaying an image, according to an exemplary embodiment of the invention.

Referring to FIG. 4, which is a flow diagram of a method for using a display device including a display screen capable of displaying an image, according to an exemplary embodiment of the invention, the method 400 includes emitting light from a plurality of light emitting elements in a layer on a substrate to a plurality of microprisms positioned over the layer (block 401), transmitting the light through the plurality of microprisms (block 403), reflecting at least some of the light to a plurality of light detectors on the substrate (block 405), sensing at least part of an image of an item in contact with the display screen at some of the plurality of light detectors (block 407), and aggregating a response from the at least some of the plurality of light detectors to form the image of the item in contact with the display screen (block 409).

When an item is in contact with the display screen, the light reflected to the light detectors can exclude those photons that leak into a contact material (e.g., a skin layer on top of a surface of the display screen), and the "some" of the light detectors referred to in blocks 407 and 409 can refer to those light detectors receiving light where there was not total internal reflectance.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 5:
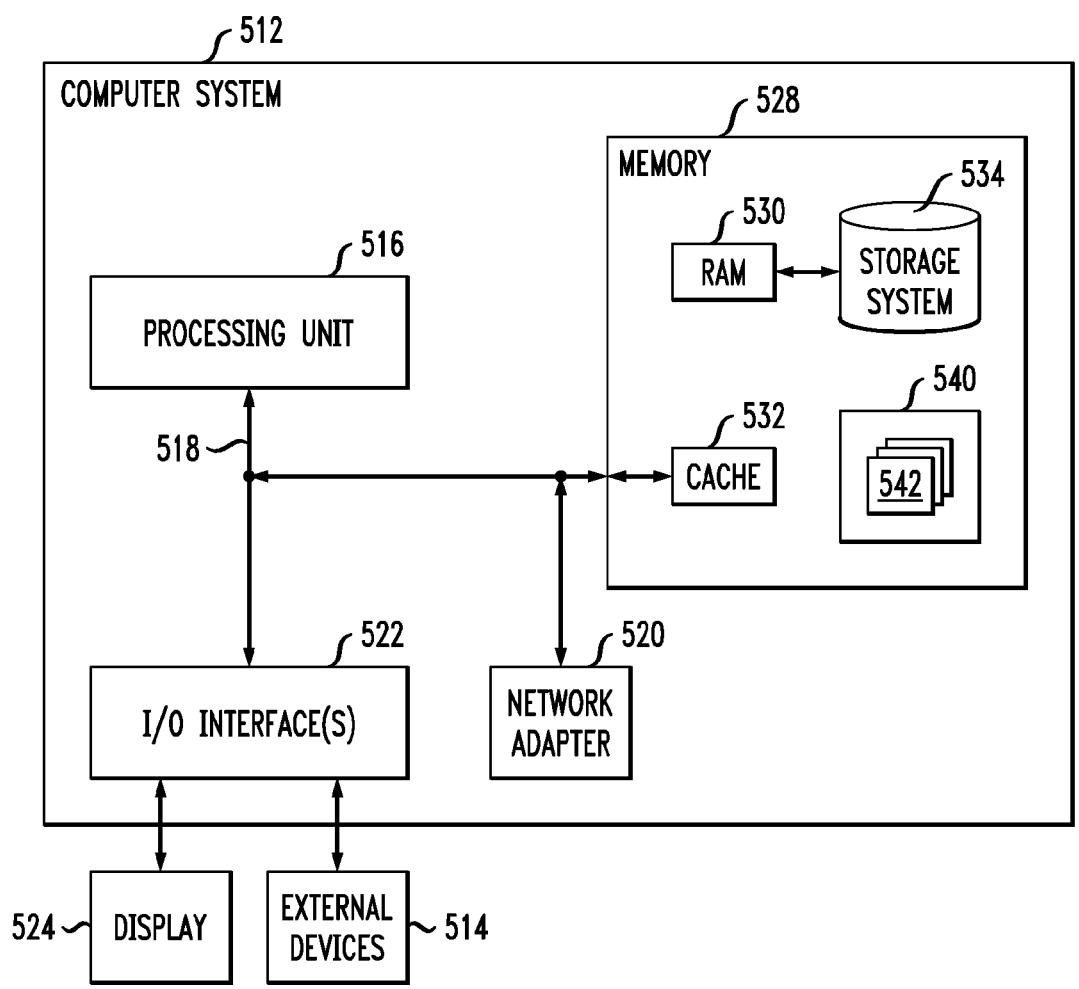
FIG. 5 illustrates a computer system in accordance with which one or more components/steps of the techniques of the invention may be implemented, according to an exemplary embodiment of the invention.

One or more embodiments can make use of software running on a general-purpose computer or workstation. With reference to FIG. 5, in a computing node 510 there is a computer system/server 512, which is operational with numerous other general purpose or special purpose computing system environments or configurations. Examples of well-known computing systems, environments, and/or configurations that may be suitable for use with computer system/server 512 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 512 may be described in the general context of computer system executable instructions, such as program modules, being executed by a computer system. Generally, program modules may include routines, programs, objects, components, logic, data structures, and so on that perform particular tasks or implement particular abstract data types. Computer system/server 512 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 5, computer system/server 512 in computing node 510 is shown in the form of a general-purpose computing device. The components of computer system/server 512 may include, but are not limited to, one or more processors or processing units 516, a system memory 528, and a bus 518 that couples various system components including system memory 528 to processor 516.

The bus 518 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer system/server 512 typically includes a variety of computer system readable media. Such media may be any available media that is accessible by computer system/server 512, and it includes both volatile and non-volatile media, removable and non-removable media.

The system memory 528 can include computer system readable media in the form of volatile memory, such as random access memory (RAM) 530 and/or cache memory 532. The computer system/server 512 may further include other removable/non-removable, volatile/nonvolatile computer system storage media. By way of example only, storage system 534 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus 518 by one or more data media interfaces. As depicted and described herein, the memory 528 may include at least one program product having a set (e.g., at least one) of program modules that are configured to carry out the functions of embodiments of the invention. A program/utility 340, having a set (at least one) of program modules 542, may be stored in memory 528 by way of example, and not limitation, as well as an operating system, one or more application programs, other program modules, and program data. Each of the operating system, one or more application programs, other program modules, and program data or some combination thereof, may include an implementation of a networking environment. Program modules 542 generally carry out the functions and/or methodologies of embodiments of the invention as described herein.

Computer system/server 512 may also communicate with one or more external devices 514 such as a keyboard, a pointing device, a display 524, etc., one or more devices that enable a user to interact with computer system/server 512, and/or any devices (e.g., network card, modem, etc.) that enable computer system/server 512 to communicate with one or more other computing devices. Such communication can occur via Input/Output (I/O) interfaces 522. Still yet, computer system/server 512 can communicate with one or more networks such as a local area network (LAN), a general wide area network (WAN), and/or a public network (e.g., the Internet) via network adapter 520. As depicted, network adapter 520 communicates with the other components of computer system/server 512 via bus 518. It should be understood that although not shown, other hardware and/or software components could be used in conjunction with computer system/server 512. Examples, include, but are not limited to: microcode, device drivers, redundant processing units, external disk drive arrays, RAID systems, tape drives, and data archival storage systems, etc.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

We claim:
1. A display device comprising:
    a plurality of light emitting elements in a layer on a substrate;
    a plurality of microprisms positioned over the layer;
    a plurality of light detectors in the layer on the substrate, each light detector respectively corresponding to and receiving light from a light emitting element of the plurality of light emitting elements;
    a display screen, wherein the plurality of light detectors are used to sense at least one property of an item in contact with the display screen; and
    a plurality of pixels;
    wherein the display device aggregates a response from at least some of the plurality of light detectors to form an image of the item in contact with the display screen;
    wherein each microprism of the plurality of microprisms respectively corresponds to a light emitting element of the plurality of light emitting elements;
    wherein each microprism of the plurality of microprisms further respectively corresponds to a light detector of the plurality of light detectors;
    wherein the display device includes a combination of a microprism with a corresponding light emitting element and corresponding light detector respectively for each pixel of the plurality of pixels;
    wherein each combination of the microprism with the corresponding light emitting element and the corresponding light detector is configured for receiving the light from the corresponding light emitting element through a first face of the microprism, and emitting the light to impinge on the corresponding light detector through a second face of the microprism opposite the first face;

wherein the plurality of microprisms are formed on a sheet on the layer including the plurality of light emitting elements and the plurality of light detectors;

wherein the sheet is bonded to the substrate via at least one bonding agent positioned in the layer including the plurality of light emitting elements and the plurality of light detectors between the sheet and the substrate; and wherein the image comprises at least one of a palm print, a fingerprint, and at least part of a document.

2. The display device of claim 1, wherein a gap is located between adjacent microprisms.

3. The display device of claim 1, wherein the display device includes between 100 and 500 microprism per inch.

4. The display device of claim 1, wherein the display screen is positioned to contact the plurality of microprisms.

5. A display device comprising:
a plurality of light emitting elements in a layer on a substrate;
a plurality of microprisms positioned over the layer;
a plurality of light detectors in the layer on the substrate, each light detector respectively corresponding to and receiving light from a light emitting element of the plurality of light emitting elements;
a display screen, wherein the plurality of light detectors are used to sense at least one property of an item in contact with the display screen; and
a plurality of pixels;
wherein a gap is located between adjacent microprisms;
wherein a light detector of the plurality of light detectors senses at least one of ambient illumination at the display screen, and diffused reflectance of an object covering the gap:
wherein each microprism of the plurality of microprisms respectively corresponds to a light emitting element of the plurality of light emitting elements;
wherein each microprism of the plurality of microprisms further respectively corresponds to a light detector of the plurality of light detectors;
wherein the display device includes a combination of a microprism with a corresponding light emitting element and corresponding light detector respectively for each pixel of the plurality of pixels;
wherein each combination of the microprism with the corresponding light emitting element and the corresponding light detector is configured for receiving the light from the corresponding light emitting element through a first face of the microprism, and emitting the light to impinge on the corresponding light detector through a second face of the microprism opposite the first face;
wherein the plurality of microprisms are formed on a sheet on the layer including the plurality of light emitting elements and the plurality of light detectors; and
wherein the sheet is bonded to the substrate via at least one bonding agent positioned in the layer including the plurality of light emitting elements and the plurality of light detectors between the sheet and the substrate.

6. The display device of claim 5, wherein the display device includes between 100 and 500 microprism per inch.

7. The display device of claim 5, wherein the display screen is positioned to contact the plurality of microprisms.

8. A display device comprising:
a plurality of light emitting elements in a layer on a substrate;
a plurality of microprisms positioned over the layer;
a plurality of light detectors on the substrate, each light detector respectively corresponding to and receiving light from a light emitting element of the plurality of light emitting elements;
a display screen, wherein the plurality of light detectors are used to sense at least one property of an item in contact with the display screen; and
a plurality of pixels, wherein:
the plurality of light detectors are positioned in the same layer as the plurality of light emitting elements;
the plurality of microprisms are formed on a sheet bonded on the layer including the plurality of light emitting elements and the plurality of light detectors;
the sheet is bonded to the substrate via at least one bonding agent positioned in the layer including the plurality of light emitting elements and the plurality of light detectors between the sheet and the substrate;
each microprism of the plurality of microprisms respectively corresponds to a light emitting element of the plurality of light emitting elements;
each microprism of the plurality of microprisms further respectively corresponds to a light detector of the plurality of light detectors;
the display device includes a combination of a microprism with a corresponding light emitting element and corresponding light detector respectively for each pixel of the plurality of pixels; and
each combination of the microprism with the corresponding light emitting element and the corresponding light detector is configured for receiving the light from the corresponding light emitting element through a first face of the microprism, and emitting the light to impinge on the corresponding light detector through a second face of the microprism opposite the first face.

9. The display device of claim 8, wherein a light detector of the plurality of light detectors is spaced apart from a light emitting element of the plurality of light emitting elements and a microprism of the plurality of microprisms is position in an area between the light detector and the light emitting element.

10. The display device of claim 8, wherein the display device includes between 100 and 500 microprism per inch.

11. The display device of claim 8, wherein the display screen is positioned to contact the plurality of microprisms.

12. A display device comprising:
a plurality of light emitting elements in a layer on a substrate;
a plurality of microprisms positioned over the layer;
a plurality of light detectors in the layer on the substrate, each light detector respectively corresponding to and receiving light from a light emitting element of the plurality of light emitting elements;
a display screen, wherein the plurality of light detectors are used to sense at least one property of an item in contact with the display screen; and
a plurality of pixels;
wherein a geometric arrangement of a light emitting element of the plurality of light emitting elements, a microprism of the plurality of microprisms and a light detector of the plurality of light detectors are such that total internal reflection occurs within the microprism;
wherein each microprism of the plurality of microprisms respectively corresponds to a light emitting element of the plurality of light emitting elements;

wherein each microprism of the plurality of microprisms further respectively corresponds to a light detector of the plurality of light detectors;

wherein the display device includes a combination of a microprism with a corresponding light emitting element and corresponding light detector respectively for each pixel of the plurality of pixels;

wherein each combination of the microprism with the corresponding light emitting element and the corresponding light detector is configured for receiving light from the corresponding light emitting element through a first face of the microprism, and emitting the light to impinge on the corresponding light detector through a second face of the microprism opposite the first face;

wherein the plurality of microprisms are formed on a sheet on the layer including the plurality of light emitting elements and the plurality of light detectors; and wherein the sheet is bonded to the substrate via at least one bonding agent positioned in the layer including the plurality of light emitting elements and the plurality of light detectors between the sheet and the substrate.

13. The display device of claim 12, wherein the display device includes between 100 and 500 microprism per inch.

14. A method for using a display device including a display screen, the method comprising:

emitting light from a plurality of light emitting elements in a layer on a substrate to a plurality of microprisms positioned over the layer;

transmitting the light through the plurality of microprisms;

reflecting at least some of the light to a plurality of light detectors in the layer on the substrate;

sensing at least part of an image of an item in contact with the display screen at some of the plurality of light detectors; and aggregating a response from the at least some of the plurality of light detectors to form the image of the item in contact with the display screen;

wherein each microprism of the plurality of microprisms respectively corresponds to a light emitting element of the plurality of light emitting elements;

wherein each microprism of the plurality of microprisms further respectively corresponds to a light detector of the plurality of light detectors;

wherein the display device includes a combination of a microprism with a corresponding light emitting element and corresponding light detector respectively for each pixel of a plurality of pixels of the display device;

wherein each combination of the microprism with the corresponding light emitting element and the corresponding light detector is configured for receiving the light from the corresponding light emitting element through a first face of the microprism, and emitting the light to impinge on the corresponding light detector through a second face of the microprism opposite the first face;

wherein the plurality of microprisms are formed on a sheet on the layer including the plurality of light emitting elements and the plurality of light detectors; and wherein the sheet is bonded to the substrate via at least one bonding agent positioned in the layer including the plurality of light emitting elements and the plurality of light detectors between the sheet and the substrate.

15. The method of claim 14, wherein the image comprises at least one of a palm print, a fingerprint, and at least part of a document.

16. The method of claim 14, wherein a geometric arrangement of a light emitting element of the plurality of light emitting elements, a microprism of the plurality of microprisms and a light detector of the plurality of light detectors are such that total internal reflection occurs within the microprism.

17. The method of claim 14, wherein the image coupled with a position of the image activate one or more functions including biometric authentication of the item.

18. The method of claim 14, wherein the image comprises a plurality of sub-images, each sub-image having an associated location in the image.

19. The method of claim 18, wherein associated locations of the sub-images specify respective finger contacts.

20. The method of claim 14, wherein the display device includes between 100 and 500 microprism per inch.

* * * * *